United States Patent [19]
Weiss

[11] Patent Number: 5,387,791
[45] Date of Patent: Feb. 7, 1995

[54] IMPURITY-DOPED OPTICAL SHOCK, DETONATION AND DAMAGE LOCATION SENSOR

[75] Inventor: Jonathan D. Weiss, Albuquerque, N. Mex.

[73] Assignee: The United States of America as represented by the United States Department of Energy, Washington, D.C.

[21] Appl. No.: 83,223

[22] Filed: Jun. 29, 1993

[51] Int. Cl.[6] .................... G01L 23/08; G01T 1/115
[52] U.S. Cl. ............. 250/227.14; 250/227.18; 385.18/12
[58] Field of Search .......... 250/227.14, 227.15, 250/227.18, 227.24, 231.1, 231.19, 227.23, 227.21, 227.11; 385/12, 126; 73/705, 655, 800

[56] References Cited
U.S. PATENT DOCUMENTS

| | | | |
|---|---|---|---|
| 4,403,143 | 9/1983 | Walker et al. | 250/227.15 |
| 4,492,121 | 1/1985 | Lehto | 250/227.11 |
| 4,775,216 | 10/1988 | Layton | 350/96.29 |
| 4,843,234 | 6/1989 | Berthold et al. | 250/227 |
| 4,931,646 | 6/1990 | Koechner | 250/367 |
| 4,936,649 | 6/1990 | Lymer et al. | 350/96.29 |
| 4,950,886 | 8/1990 | Claus et al. | 250/227.14 |
| 4,999,504 | 3/1991 | Braunlich et al. | 250/484.1 |
| 5,026,141 | 6/1991 | Griffiths | 350/96.29 |
| 5,107,129 | 4/1992 | Lombrozo | 250/554 |
| 5,142,141 | 8/1992 | Talat et al. | 250/227 |

Primary Examiner—David C. Nelms
Assistant Examiner—Stephone B. Allen
Attorney, Agent, or Firm—Luis M. Ortiz; James H. Chafin; William R. Moser

[57] ABSTRACT

A shock, detonation, and damage location sensor providing continuous fiber-optic means of measuring shock speed and damage location, and could be designed through proper cabling to have virtually any desired crush pressure. The sensor has one or a plurality of parallel multimode optical fibers, or a singlemode fiber core, surrounded by an elongated cladding, doped along their entire length with impurities to fluoresce in response to light at a different wavelength entering one end of the fiber(s). The length of a fiber would be continuously shorted as it is progressively destroyed by a shock wave traveling parallel to its axis. The resulting backscattered and shifted light would eventually enter a detector and be converted into a proportional electrical signals which would be evaluated to determine shock velocity and damage location. The corresponding reduction in output, because of the shortening of the optical fibers, is used as it is received to determine the velocity and position of the shock front as a function of time. As a damage location sensor the sensor fiber cracks along with the structure to which it is mounted. The size of the resulting drop in detector output is indicative of the location of the crack.

17 Claims, 8 Drawing Sheets

IMPURITY-DOPED OPTICAL SHOCK, DETONATION AND DAMAGE LOCATION SENSOR

The U.S. Government has rights in this invention pursuant to contract No. DE-AC04-76P00789 between the United States Department of Energy and American Telephone and Telegraph (AT&T) Corporation.

FIELD OF THE INVENTION

The present invention relates generally to optical sensors used to detect the velocity and location of shock waves, detonation fronts, and crack positions on a structure. More specifically, the invention is directed to a sensor providing continuous. fiber-optic means of measuring shock speed and location, and could be designed through proper cabling to have virtually any desired crush pressure. However, the invention is also adaptable to applications involving detonation detection and location, as well as location of structural cracks, breaks or strains.

BACKGROUND OF THE INVENTION

The detection of shock and crack location provides important information to researchers or technicians concerned with underground nuclear and explosives testing, earthquake detection, and structural failure diagnostics. Electrical sensing systems are susceptible to electromagnetic interference, including lightning, and other atmospheric conditions which will tend to affect the accuracy of typical electronic measurement systems. Optical detection systems employing bulk optics, as opposed to optical fibers, often suffer from loss of alignment and cleanliness of their components, particularly in a field environment.

U.S. Pat. Nos. 5,107,129 (Lombrazo) and 5,142,141 (Talet et al.) disclose fibers that are broken as part of their detection process. Talet involves the detection of cracks while Lombrazo detects burn rate, both using optical fibers. The primary embodiments of Talet's multiple-loop arrangement is used. The breakage of one loop after another indicates the arrival of the burn front or the crack at the position of the loop. Both disclosures implicitly assume that each loop will be broken in an equivalent position. Although both disclosures differ in terms of proposed function, they are essentially structurally identical.

U.S. Pat. No. 4,843,234 (Berthold et al.) involves the measurement of the length of a single fiber using Optical Time Domain Reflectometry, which is a well known technique for determining the round trip travel time of a light pulse down the length of an optical fiber. The shortest length change detectable depends on the pulse repetition rate and the pulse length based on reflection.

Finally, U.S. Pat. No. 4,936,649 (Lymer et al.) mentions interdigitated optical fibers and "volume backscattering" as a means of determining the location of structural damage.

The present invention would provide a continuous fiber optic means of measuring shock location. Depending on the strength of the cable surrounding the fiber, this device could be designed with virtually any threshold crush pressure. One could also have considerable latitude in choosing the length over which this device is sensitive to shock pressure. The optical nature of the sensor causes it to be immune to electromagnetic interference and incapable of transmitting electrical signals that may contain sensitive information to the outside world. The optical nature of the sensor also reduces inaccuracies in the system that could be caused by various sources of electromagnetic interference. These features are in contrast to those of the leading existing devices, such as the SLIFER (Shorted Location Indication by Frequency of Electrical Resonance) and CORRTEX (Continuous Reflective Radius Time Experiment) coaxial cable type transducer devices whose outputs are discrete and electrical, and whose minimum crush strength is known to produce misleading measurements at low shock pressures. The present invention also overcomes the shortcomings of current fiber-optic devices that suffer from poor spatial resolution and bulkoptic devices that suffer from alignment problems. It is therefore desirable to fulfill the need for a shock and damage location detector that overcomes the shortcomings of the current art electrical and optical detectors.

SUMMARY OF THE INVENTION

In view of the above-described needs, it is an object of the present invention to provide an apparatus that can provide continuous measurement of shock and crack location with a desired or predetermined crush pressure, and which overcomes the shortcomings of the prior art. The device of the present invention would comprise of one or a plurality of parallel multimode optical waveguides, or singlemode waveguides constructed with an elongated cladding, doped along their entire length with impurities to fluoresce at a predetermined wavelength when pumped by light entering one end of each waveguide. Through the process of fluorescence the wavelength of the fluorescence light would be shifted with respect to the wavelength of the light entering the waveguide(s). The light would eventually enter a receiver/detector and be converted into a proportional electrical signal. In use as a shock speed sensor, the length of the waveguide would be continuously shortened as it is progressively destroyed by a shook wave. This process also reduces the number of fiouresc-ers contributing to the signal. The corresponding reduction in output, as a known function of waveguide length, would then be used to determine the position of the hock front as a function of time. As a damage location sensor, the waveguide would be intimately bonded to a structure known to be susceptible to cracking. When a crack reaches any point along the fiber, the sudden drop in fluorescence output would be indicative of the existence and location of the crack.

During basic operation of the sensor, "pump" light emerges from a source, such as a laser, passes through a fiber-optic coupler and, if necessary, into a lead fiber connecting the sensor fiber to the source and detector. The distributed fluorescence light generated in the sensor fiber returns, via the lead fiber and the coupler, to a detector, such as a photodiode. While only one sensor fiber may be used, additional lead and sensing fibers connected to other outputs of the coupler could be used to increase the signal. An additional way of enhancing the signal-to-noise ratio of the system when used for shock front location is through use of an optical filter placed in front of the detector that passes the fluorescence while absorbing most any broadband shock induced luminescence also generated in the fiber.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention, in which:

FIG. 6 illustrates results of an explosives experiment with the pump beam turned on.

DETAIL DESCRIPTION OF THE PREFERRED EMBODIMENTS

Through fluorescence radiation from an impurity-doped fiber, this sensor will provide a continuous measure of shock position and damage location. The principle on which this fiber-optic shock position and damage location sensor works is what may be referred to as "volume fluorescence", where a core of an optical fiber forms the volume in question and impurities distributed within this core fluoresce in response to "pump" light passing through it.

Figure 1:
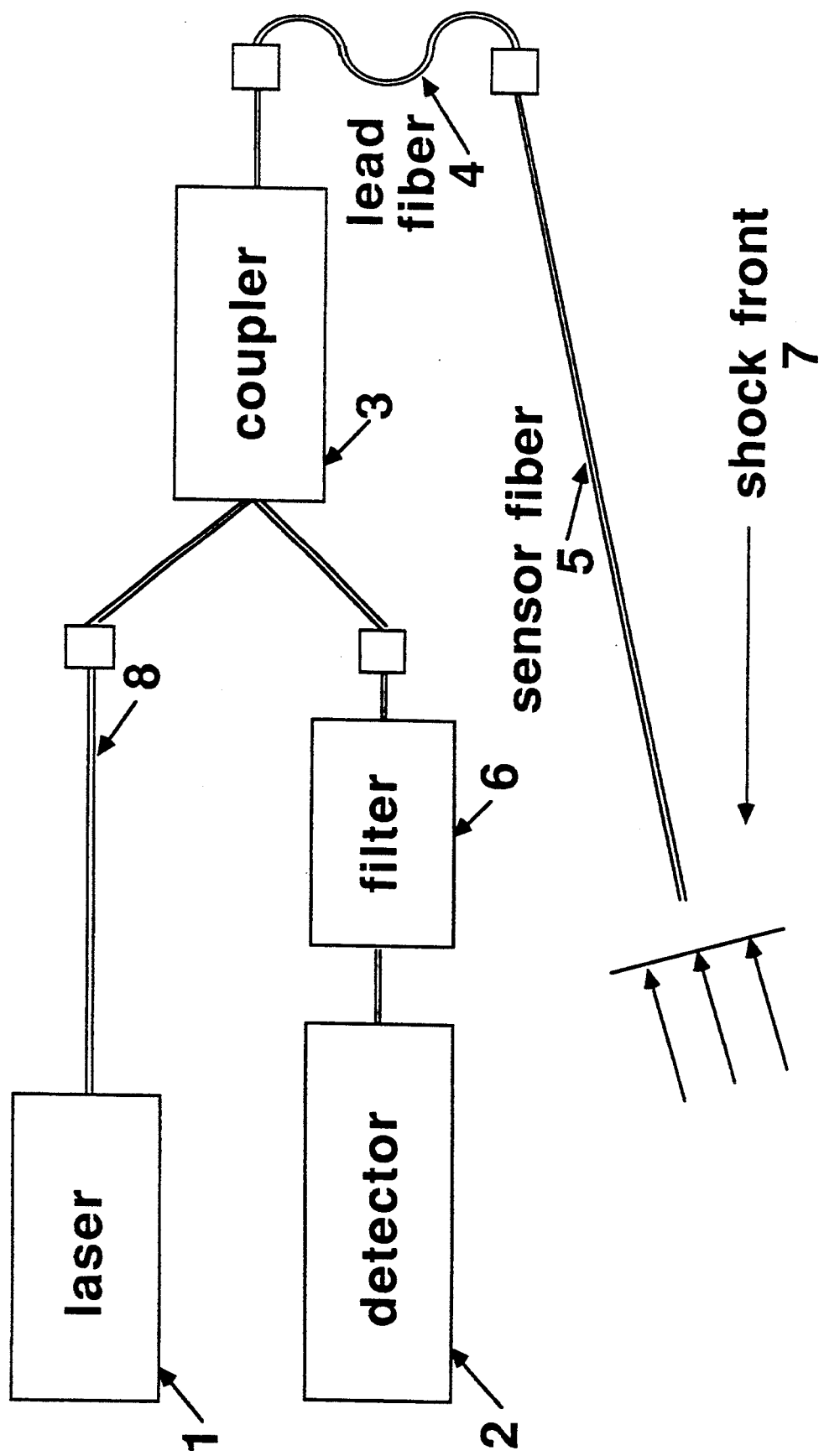
FIG. 1 is a illustration of the basic sensor configuration with arrows indicating the direction of the potential shock front.

Referring to FIG. 1, there is illustrated an application of this principle. A steady laser source 1 of "pump" light, an optical detector 2, a fiber optic coupler 3, a lead fiber 4, and an impurity-doped sensor fiber 5 are provided. Light from the laser 1 passes through the fiber optic coupler 3, through the lead fiber 4, and finally through the sensor fiber 5 toward the shock front 7. Light at one wavelength entering the sensor fiber 5 results in fluorescence at a different wavelength because of the impurity doping within the sensor fiber 5. The portion of the fluorescence signal guided back along the sensor fiber 5 will reach the detector 2. The detector 2 is equipped with a standard optical filter 6 so as to receive only the fluorescence light at the desired wavelength caused by the impurity doping of the sensor fiber 5. The radiation eliminated by the filter 6 could be "pump" light reflected off of various fiber ends, most critically the far end which continuously changes character during the measurement of shock position in a manner unrelated to fiber length. Depending on the instantaneous character of the end of the sensor fiber, the return signal could even rise temporarily as the fiber length is reduced, were it not for the shift in wavelength. Removing this source of noise is the primary reason for shifting the wavelength of the fluorescence signal with respect to that of the pump beam emerging from laser source 1. Shock-induced luminescence generated within the sensor fiber 5 could be another source of unwanted radiation, but not when this device is used quasi-statically as a damage location sensor. In this regard, the wavelength shift is even more critical when this device is used as a damage location sensor than for the location of a shock front. In the latter case, end reflections result in noise superimposed upon a continuous curve. In the former, it is envisioned that a few discrete measurements will be made resulting from cracks at arbitrary points along the sensor fiber 5. An actual rise, or other significant change in signal caused by relatively clean break, would completely negate its use for this purpose. The wavelength shifts a significant difference between the current invention and that of Lymer (U.S. Pat. No. 4,936,649).

Because the filtered return signal increases with the number of fluorescing centers, the detector 2 output will diminish as the sensor fiber 5 is reduced in length (or volume) by progression of the shock front through the sensor fiber 5. Thus, the measurement of the detector output v. time yields shock position v. time, provided that the return signal is a known—the single-value function of sensor fiber 5 length. Shock velocity follows immediately upon differentiation.

Although the most desirable form of the detector 2 output v. sensor fiber 5 length would be a straight line, it can only be achieved if the concentration of dopants vanes along the length of the sensor fiber 5. Because the manufacture of such a sensor fiber 5 would be difficult, uniform doping and the resulting nonlinear relationship between the signal and the sensor fiber 5 length is preferred. Despite the nonlinearity, this relationship, as stated in Equation 1 below, is a simple one.

$$I_d(L) = K(1 - e^{-aL}), \quad (1)$$

where: $I_d(L)$ is the detector output as a function of sensor fiber length L; the quantity K is a constant involving the detector efficiency, various coupling losses in the system, and the strength of the laser; $a$ is the sum of the absorption coefficient for the "pump" beam and the much smaller absorption coefficient for the fluorescence radiation passing through the sensor fiber.

Figure 2:
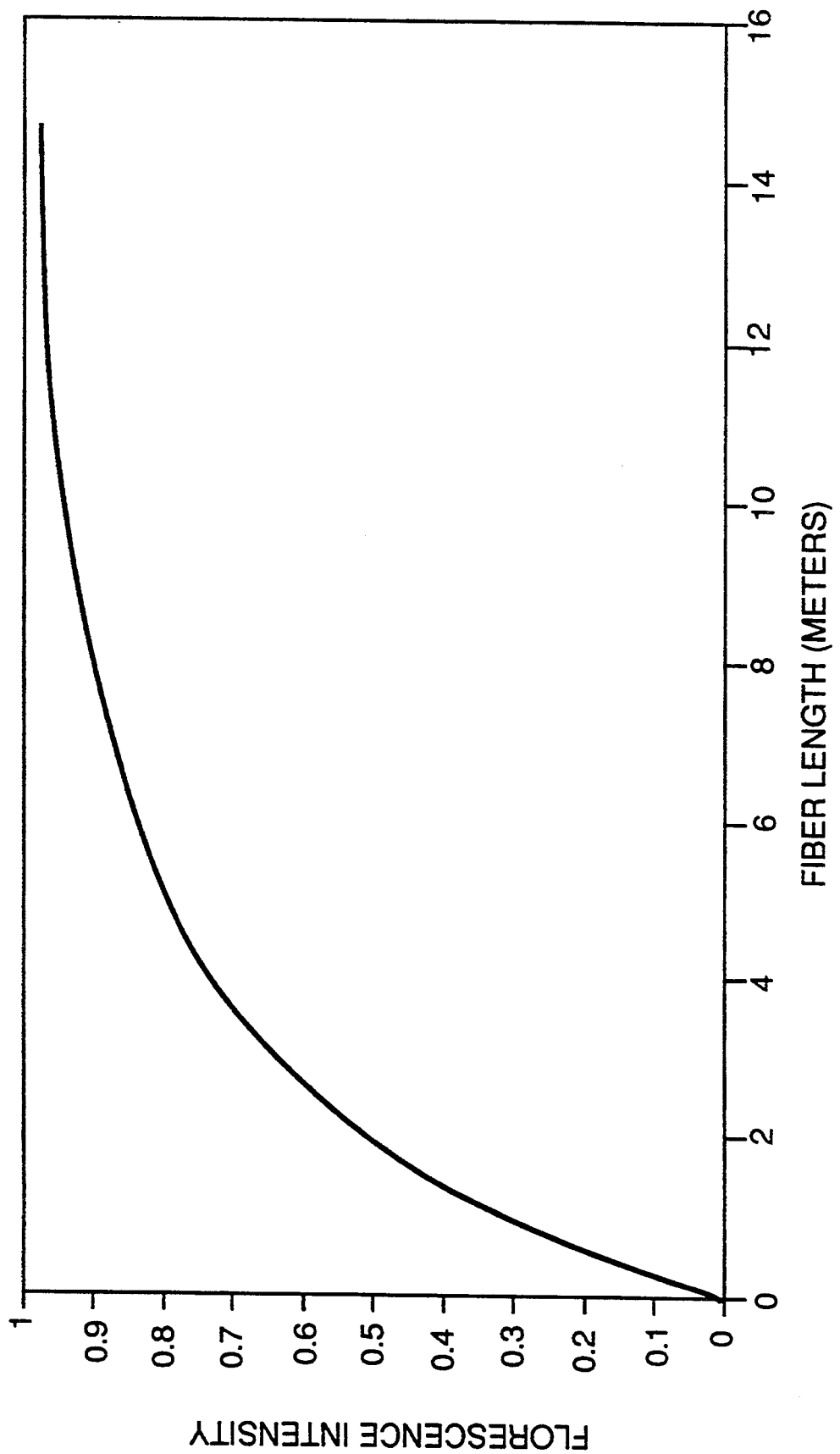
FIG. 2 is a graphical illustration of detector output v. fiber length.

Ignoring irrelevant constants, shown plotted in FIG. 2 is the function with $a = 0.3$/meter. It clearly loses sensitivity at long sensor fiber lengths, and noise in the system renders measurements in that region impossible. Through proper doping, $a$ could be tailored to the sensor fiber in order to maintain high sensitivity $(dI_d/dL)$ over its entire length. One could maximize the minimum sensitivity by making $a = 1/L_0$, where $L_0$ is the starting length of the sensor fiber. If this is done, the sensitivity drops by a factor of e from its maximum to its minimum value. It might be desirable to create a function linear in sensor fiber length by plotting the original function logarithmically, i.e.;

$$-Ln[(1 - I_d(L)/K] = aL. \quad (2)$$

Within the insensitive region of FIG. 2 is where noise-induced fluctuations in $I_d(L)$ are most likely to cause the argument of the logarithm to become negative. Such an occurrence would negate the utility of Equation 2, although a fit could still be made to Equation 1. Thus one might limit the fiber length to, perhaps, 6 meters for this particular value of $\alpha$. Having determined the starting length $L_o$, the constant K would be determined by measuring the system response at this length, for example;

$$K = I_d(L_o)/(1-e^{-\alpha L_o}).$$

The product of the ground shock measurement is the detector output v. time. As far as the data analysis is concerned, a plot of the left-hand side of Equation 2 essentially yields the fiber length as a function of time, whose derivative is the shock velocity. This velocity is now known as a function of both time and position along the fiber. For constant shock velocity v, as an example, the plot would be a straight line extending diagonally from $\alpha L_o$ at time 0 to $\alpha L=0$ at time $L_o/v$.

Figure 3:
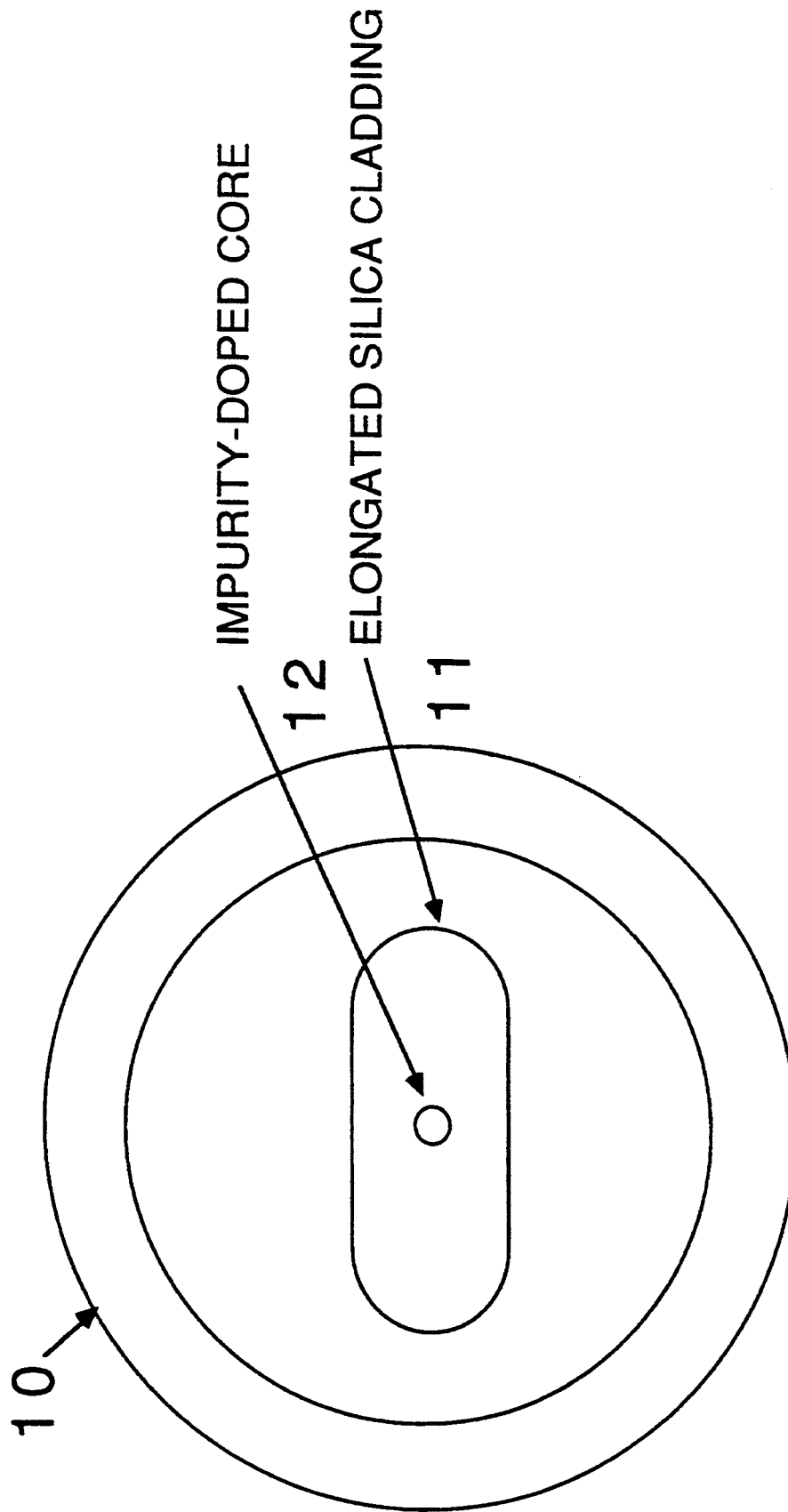
FIG. 3 is a cross-sectional view of a preferred fiber or waveguide.

Referring to FIG. 3, the currently manufacturable sensor fiber 10, or waveguide 10, consists of an elongated cladding 11 surrounding a singlemode doped core 12. This design allows the core to be adequately pumped with light from a conventional multimode fiber or light source. The shape of the cladding 11 forces skew rays to pass through the core 12 that would have otherwise corkscrewed around it, had the cladding been circular. A sensor fiber consisting of a multimode core and circular cladding would be geometrically compatible with the conventional lead fiber. As such, it would produce greater overall system efficiency than the current design. However, distributing the fluorescing impurities over the much larger core area has not been attempted, although there appears to be no fundamental reason why it could not be done.

Neodymium, erbium and/or other rare earth impurities, can be used in the manufacture of the optical fiber 10 by doping of the fiber core 12 in order to achieve the desired fluorescence wavelength. In experiments performed on this device, neodymium was the dopant. Its wavelength of fluorescence radiation, 1060 nm, is convenient because it is readily transmitted through standard communications fibers.

Three tests were performed to characterize the behavior of the impurity doped fiber-optic sensor. These test were: a static laboratory test to establish the basic relationship between the sensor fiber length and the magnitude of the fluorescence signal; an above-ground explosives test to examine the output of the fiber under simulated ground shock; and a measurement of the shape and width of the fluorescence line. The tests are in no way meant to limit the application of the invention, but are provided in order to better teach the effectiveness of the invention.

The experimental configuration of the test apparatus was similar to that depicted in FIG. 1, in which an 810 nm laser diode served as the pump 1 and a silicon photodiode served as the detector 2. A long-wavelength-pass optical filter 6 placed in front of the detector had a 50% transmission point at 1000 nm and passed only about $0.5 \times 10^4$ of the pump wavelength. Referring again to FIG. 1, when performing the linewidth measurement, a fiber pigtail 8, from the laser source 1, was connected directly to the sensor fiber 5 in order to produce a larger fluorescence signal. Doing so resulted in the examination of the fluorescence radiation propagating in the forward rather than the backward direction, the difference having no bearing on the measurement.

Figure 4:
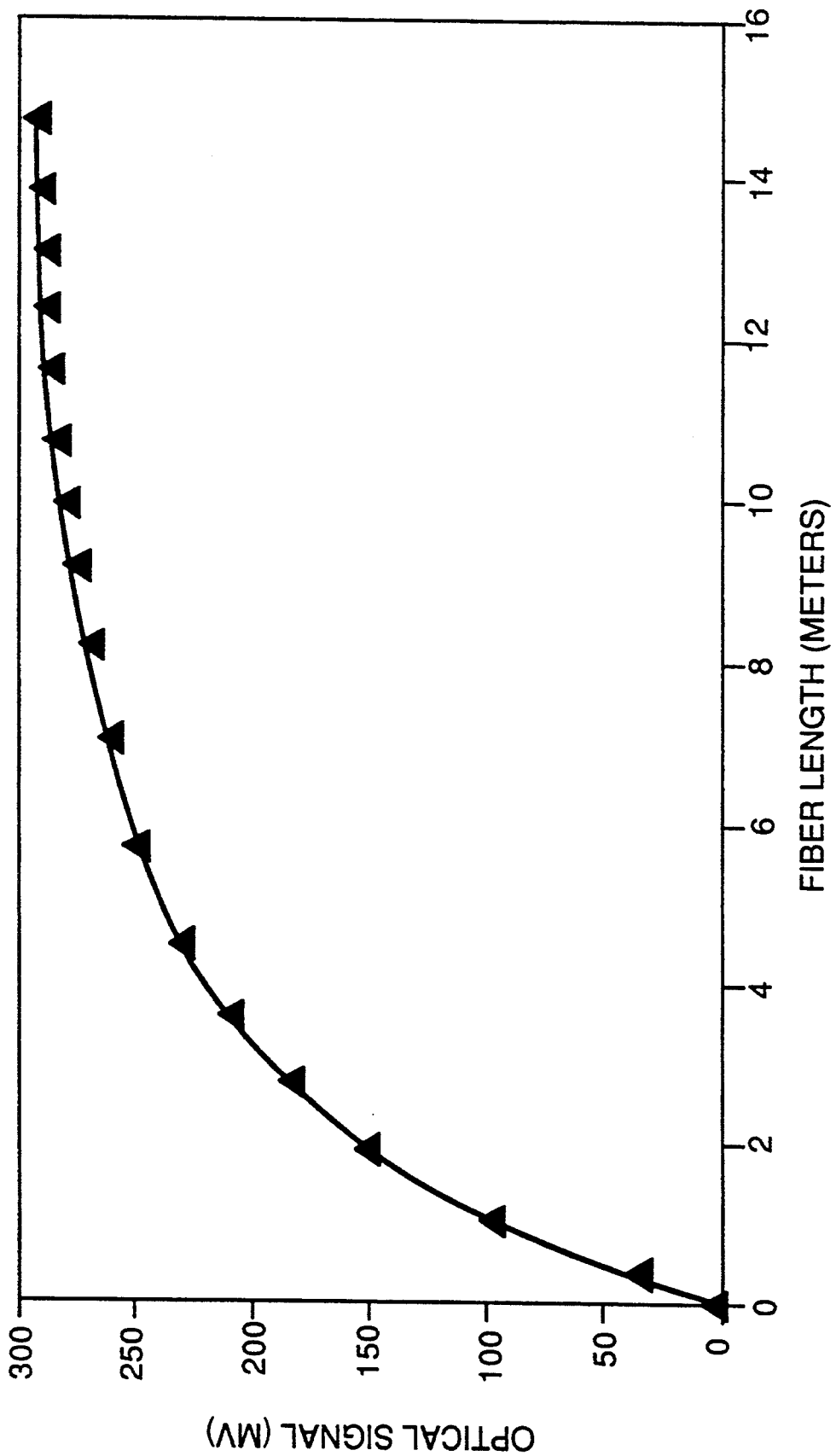
FIG. 4 is a graphical illustration detector voltage v. the remaining fiber length during a laboratory experiment of the invention.

For the basic laboratory test, 15 meters of fiber were laid out around the periphery of an optical table. The fiber was cut three feet at a time and the detector voltage V. the remaining fiber length was plotted, as seen in FIG. 4. The resulting curve essentially reaches its asymptotic limit at a fiber length of 15 meters, where the detector voltage was 288 mV. Thus, (L) can be written as;

$$Sig(L) = 288(1-e^{-\alpha L}) \, mV,$$

where Sig(L) is the detector voltage at fiber length L, and $$-Ln[1-Sig(L)/288] = \alpha L.$$

Figure 5:
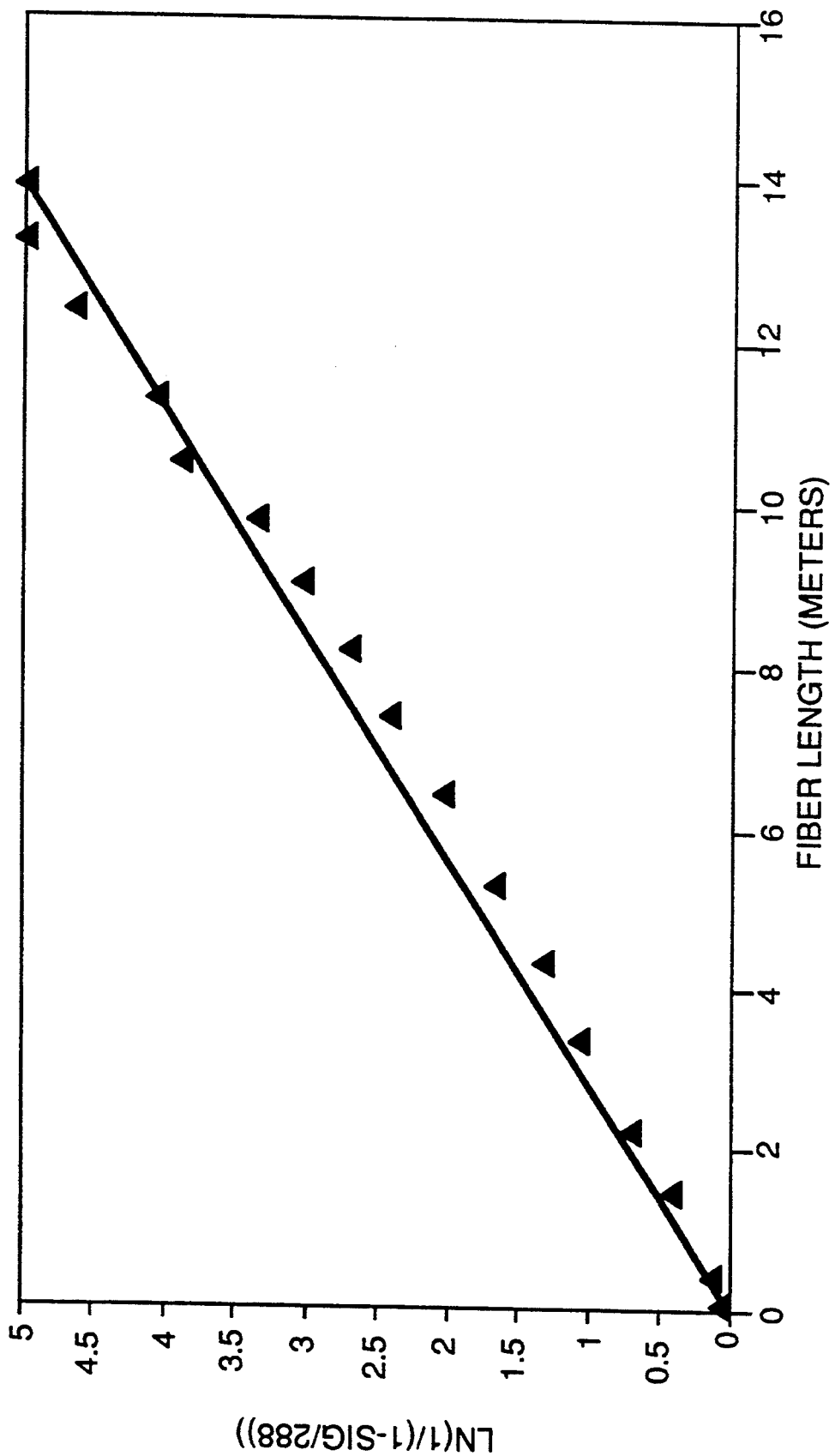
FIG. 5 is a logarithmic function of voltage plotted against fiber length during an experiment, demonstrating a linear relationship between the two quantities.

The left-hand side of the function is plotted against fiber length in FIG. 5, which demonstrates a linear relationship between tile two quantities and thus validate Equation 1. The straight line in this figure is the least squares fit to the data and has a slope of 0.357/meters or 1.55 db/meter.

Figure 6:
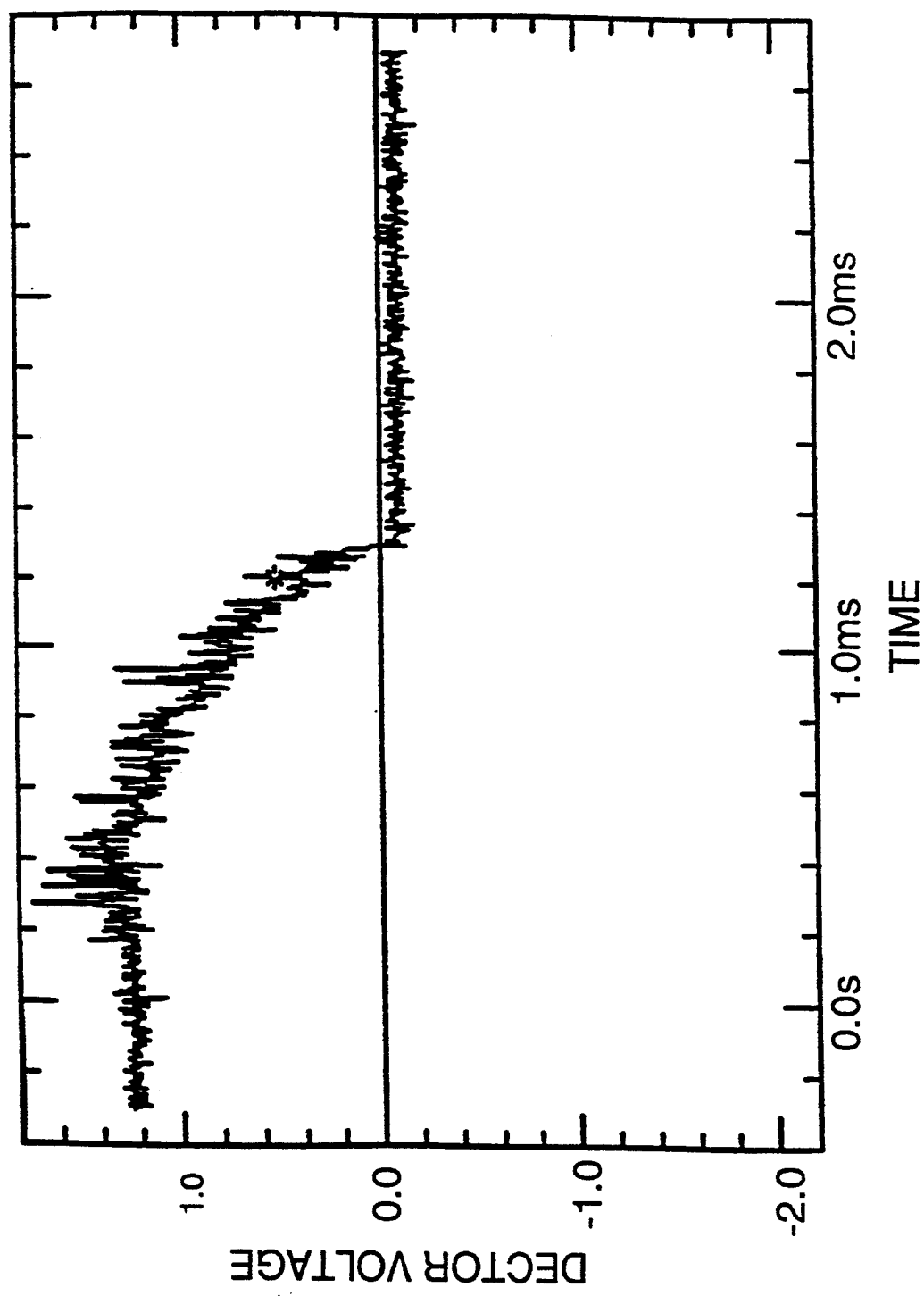
Figure 7:
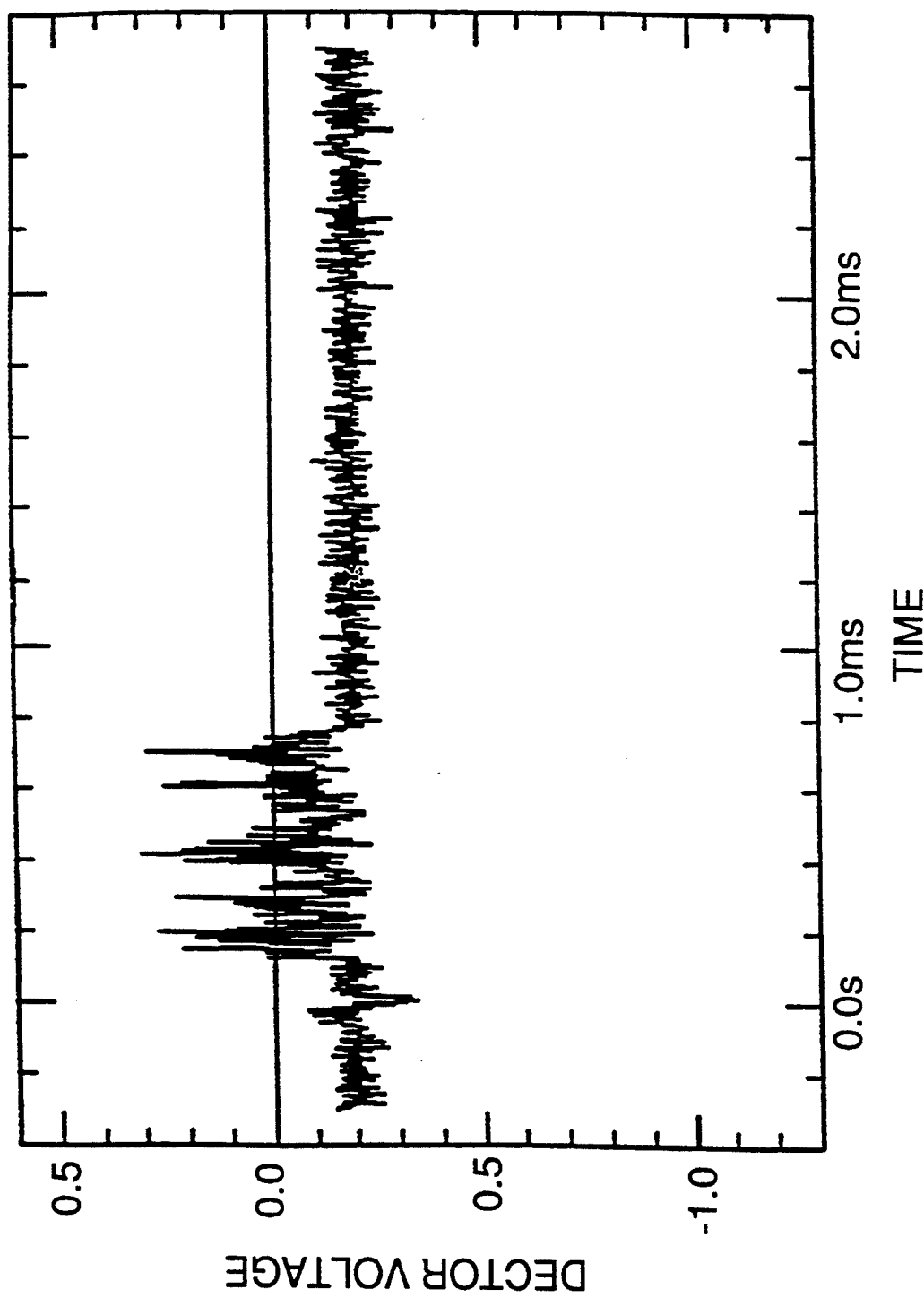
FIG. 7 illustrates the results of an explosives experiment with the pump beam turned off.

For the explosives test, 30 feet of fiber were laid out. Along side the sensor fiber was placed a length of detonation cord with several feet extending beyond the far end of the fiber. The detonation of the cord, started at its far end and travelling at about 7 mm/$\mu$sec. simulated ground shock. The results of this experiment are illustrated in FIG. 6. Once the detonation reached the end of the fiber, the curve possesses the same basic shape as that in FIG. 4, though reversed. This reversal exists because FIG. 6 is a plot of detector output against time, which is proportional to the length of fiber destroyed, not the length remaining. Aside from the curve's general shape, its other main feature consists of the large noise spikes lasting as long as the fiber was being shocked and having an amplitude much greater than detector noise, which is displayed by the width of the baseline on either side of the detonation period. The noise spikes could not have been an electrical disturbance associated with the detonation itself infiltrating the electronics because they did not exist between the time the detonation started and the time it reached the fiber. Based on the data from a subsequent experiment with the pump laser turned off, it was concluded that shock-induced luminescence in the fiber caused the noise spikes. The results of this experiment, in which a shorter length of fiber was used, are illustrated in FIG. 7. The character of the noise is the same with or without the pump beam.

There are two reasons why the noise spikes were so large. First, the gain of the detection system was extremely high, with a sensitivity on the order of 1 output volt/$\mu$watt of optical power incident on the detector. The high gain also accounts for the rather wide baseline. In addition, the spectral bandpass of detection system, bounded by the long-pass optical filter at its lower end and the detector response at its upper end, was relatively broad. It extended from the cut-in of the filter, at something under 1000 nm (depending on exactly cut-in is defined), to 1150 nm, where the sensitivity of the silicon detector drops to zero. Because the shock-induced luminescence is spectrally broadband, its contribution to the signal is essentially proportional to the width of the spectral bandpass of the system. In contrast to 150 nm, narrowband optical filters are readily available with a width of 10 nm. Also, depending on the width of the fluorescence line, it is possible to narrow the bandpass of the system without sacrificing the signal. Fluorescence narrowing can be accomplished through the co-doping of the neodymium, or other impurity, with phosphorous. Electronic temporal filtering also could be employed to filter out (eliminate) the noise spikes, while maintaining the integrity of the much more slower varying signal of interest. As a damage location sensor, however, shock induced luminescence is not a problem because the fiber is not being shocked continuously; therefore, phosphorous would not need to be added.

Figure 8:
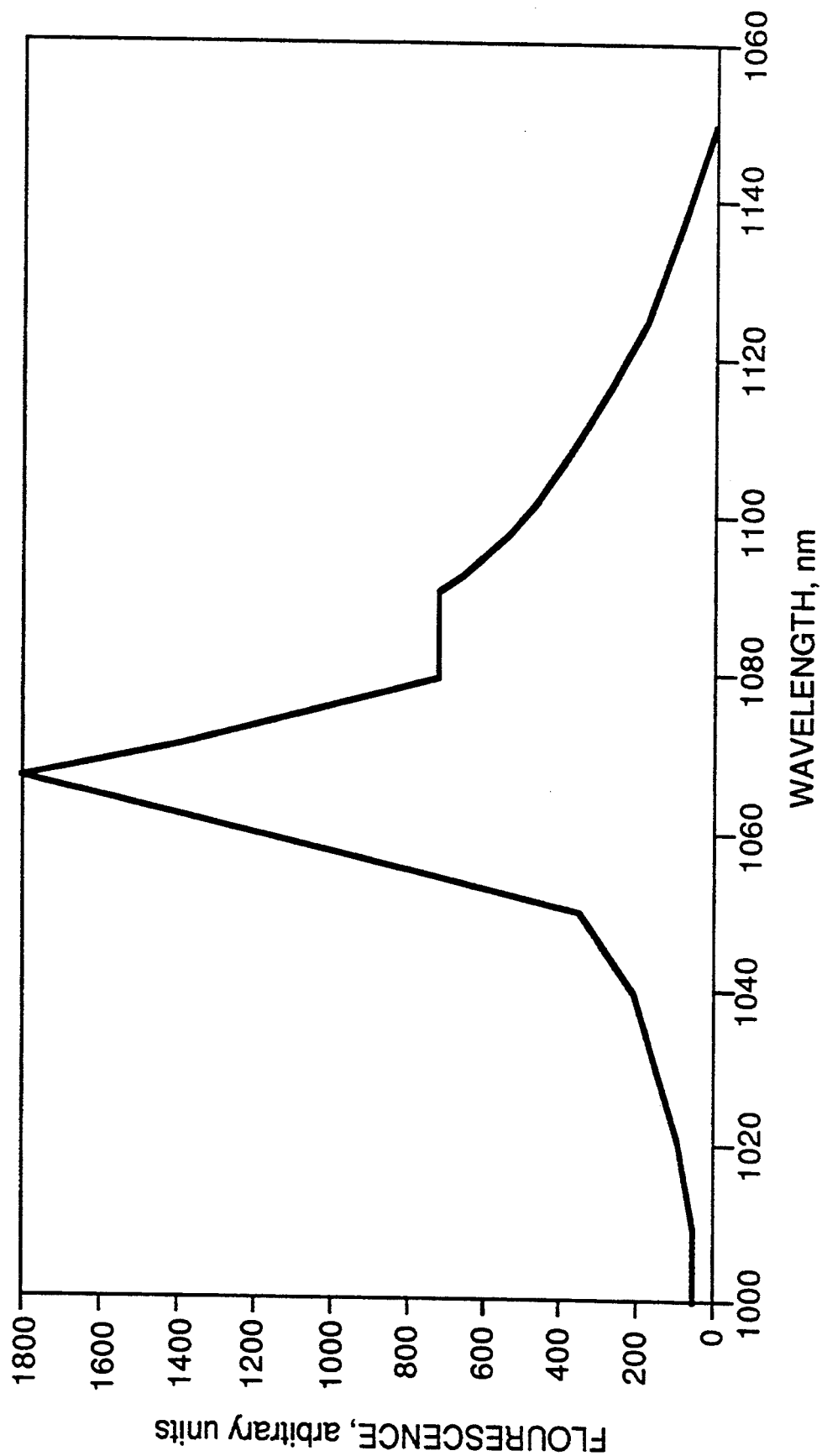
FIG. 8 illustrates the results of a fluorescence linewidth test.

The final experiment was the fluorescence linewidth measurement, the result of which is illustrated in FIG. 8. An indeterminate length of invention as a damage location sensor, in contrast to the few milliseconds required for shock location. Consequently, it is also anticipated that gradual changes in the laser output, or macrobends in the lead fibers, will occur and affect the signal. Such long-term changes in signal level are unlikely to be confused with the sudden drop caused by a crack in the sensor fiber. A value of the constant K in Equation 1 will be known from the data record just before this event takes place. If, for some reason, such is not the case, this eventuality could be met by co-doping the sensor fiber with erbium. Since this element fluoresces at about 1530 nm, its fluorescence output is readily separable from that of the neodymium. Provided that the value of $\alpha$ associated with the erbium is sufficiently different from the one associated with the neodymium, a ratiometric measurement of the two signals could be performed that would eliminate the above effects, common to both.

Other embodiments of the invention will be apparent to those skilled in the art from a consideration of this specification of practice of the invention disclosed herein. It is intended that the specification and the examples be considered as exemplary only, with the true scope and spirit of the invention being indicated in the following claims.

What is claimed is:

1. An impurity-doped optical shock, detonation and damage location sensing apparatus, comprising:
   a) at least one impurity-doped optical waveguide transmitting and receiving means coupled to an illumination means, said at least one waveguide doped with impurities that will shift the wavelength with respect to that of the illumination means of light fluorescing in response to the light from the illumination means within said at least one waveguide; and
   b) a detector means coupled to said at least one waveguide means, said detector further comprising a filtering means for filtering out backscattered light that is not shifted in wavelength;
   wherein shock or detonation caused along said waveguide means causes said waveguide means to shorten in response to said shock or detonation while said fluorescing light shifted in wavelength within said waveguide means is detected by said detector means which senses variations in light intensity within said waveguide means, said variations being indicative of the shock location along said waveguide means.

2. The apparatus of claim 1, wherein said waveguide means further comprises a doped multimode optical fiber.

3. The apparatus of claim 1, wherein said waveguide further comprises an elongated cladding surrounding a singlemode doped core wherein said elongated cladding allows said core to be adequately pumped with light from said illumination means.

4. The apparatus of claim 3, wherein said doped core is doped with neodymium.

5. The apparatus of claim 4 wherein said waveguide is fabricated to be responsive at a preselected crush pressure.

6. The apparatus of claim 1 wherein said detector means further comprises an optical to electrical converting means for converting said fluoresced and shifted light sensed by said waveguide means and received by said detector into corresponding electrical signals.

7. The apparatus of claim 6 further comprising a computer means for analyzing said corresponding electrical signals, wherein the corresponding reduction in fluorescence and shifted light output from said waveguide means would then be used by said computer means, after conversion by the detector means into electrical signals, to determine the position of the shock front as a function of time.

8. A shock velocity and damage location sensor comprising:
   a) at least one parallel optical fiber doped along its entire length with impurities for fluorescing light at a different wavelength in response to light entering said at least one fiber:
   b) an illumination means coupled to said at least one fiber for illuminating said at least one fiber;
   c) an optical receiving and converting means coupled to said at least one fiber wherein light fluoresced from said fiber will be received and converted into an electrical signal;
   wherein the length of said fiber would be continuously shortened as it is progressively destroyed by a shock wave travelling parallel to its axis and a corresponding reduction in illumination received by said optical receiving and converting means would then be used to determine the position and velocity of said shock wave front as a function of time.

9. The apparatus of claim 8, wherein said at least one fiber further comprises an elongated cladding surrounding a singlemode doped core wherein said elongated cladding allows said core to be adequately pumped with light from said illumination means.

10. The apparatus of claim 9, wherein said doped core is doped with Neodymium.

11. The apparatus of claim 9 wherein said at least one fiber is fabricated to be responsive at a preselected crush pressure.

12. The apparatus of claim 9 wherein said optical receiving and converting means further comprises:
   an optical to electrical converting means for converting said fluorescing light of said at least one optical fiber that is received by said optical receiving and converting means into electrical signals corresponding to the volume of said optical fiber; and
   a computer means for analyzing said corresponding electrical signals, wherein the corresponding reduction in fluoresced light from said fiber means would then be used by said computer means, after conversion into electrical signals, to determine the position of the shock front as a function of time.

13. An impurity-doped fiber-optic disturbance location sensing apparatus, comprising:
   a) an impurity-doped optical fiber receiving and transmitting means coupled to an illumination means, said fiber doped with impurities that will shift the wavelength of fight fluorescing within said fiber;

b) a filtering means coupled to said fiber for filtering out backscattered light and light from said illumination means that is not fluorescing light shifted in wavelength; and c) a detector means coupled to said filtering means said detector for detecting fluorescing light passed by said filtering means from said fiber means;

wherein disturbance caused along said fiber causes a change in volume within said fiber in response to said disturbance and said change in volume of said fiber causes a change in said fluorescing light detected by said detector means, said change being indicative of the location of a disturbance along said fiber.

14. The apparatus of claim 13 wherein said fiber is fabricated to be responsive at a preselected crush pressure, or crack-inducing tension.

15. The apparatus of claim 13 wherein said fiber is doped with impurities that cause the wavelength of entering light to be shifted at more than one wavelength, and said apparatus further comprises at least two filtering means each filtering means having a corresponding detector means, wherein each of said filtering means and corresponding detector means is responsive to light fluorescing at different wavelengths.

16. The apparatus of claim 15 wherein said fiber is doped with neodymium and erbium.

17. The apparatus of claim 15 wherein said detector means further comprises:

an optical to electrical converting means for converting fluorescing light received by said detector means into corresponding electrical signals; and a computer means for analyzing said corresponding electrical signals, wherein the corresponding reduction in fluorescing light frown said fiber means is used by said computer means, after conversion into electrical signals, to determine the location of the disturbance.

* * * * *